United States Patent [19]

Treharne

[11] 4,404,229
[45] Sep. 13, 1983

[54] METHOD FOR THE PRODUCTION OF MOLDED MEAT OR MEAT-LIKE PRODUCTS

[75] Inventor: Timothy J. M. Treharne, East Grinstead, England

[73] Assignee: Tivet Developments Ltd., East Grinstead, England

[21] Appl. No.: 241,818

[22] Filed: Mar. 9, 1981

Related U.S. Application Data

[62] Division of Ser. No. 941,872, Sep. 13, 1978, Pat. No. 4,280,803.

[30] Foreign Application Priority Data

Sep. 14, 1977 [GB] United Kingdom ............... 38395/77

[51] Int. Cl.³ ........................ A22C 11/00; A23B 4/12; A23L 1/31
[52] U.S. Cl. ........................................ 426/513; 17/32; 426/92; 426/277; 426/517
[58] Field of Search ............... 426/513, 517, 442, 276, 426/277, 92, 138, 254, 646; 17/32, 35

[56] References Cited

U.S. PATENT DOCUMENTS 2,897,745  8/1959  Nichols et al. ..................... 426/513

FOREIGN PATENT DOCUMENTS

46-1189  1/1971  Japan ................................ 426/513
1441494  6/1976  United Kingdom .

Primary Examiner—Raymond N. Jones
Assistant Examiner—George C. Yeung
Attorney, Agent, or Firm—Neil F. Markva

[57]  ABSTRACT

A method and apparatus for the production of molded meat or meat-like products, for example sausages. The surface of the product is treated with a fluid, which could be for coloring or flavoring purposes, but is advantageously e.g. an edible acid adapted to react with protein in the product to form a cohesive surface and enable the use of a separate skin to be avoided. The mold includes a permeable wall, for example of sintered stainless steel, through which the fluid can be introduced. In a preferred embodiment the wall is defined by a hollow cylinder disposed in a non permeable housing containing the fluid. An end cap closes one end of the cylinder and a plunger compresses the material to form the product. At the same time additional fluid is injected through a nozzle into the housing, to cause a corresponding quantity of fluid to pass through the cylinder wall and treat the surface of the product.

13 Claims, 10 Drawing Figures

METHOD FOR THE PRODUCTION OF MOLDED MEAT OR MEAT-LIKE PRODUCTS

This is a division of application Ser. No. 941,872, filed Sept. 13, 1978, U.S. Pat. No. 4,280,803.

Field of the Invention

This invention relates to a method and apparatus for the production of molded meat or meat-like products, i.e. protein products. Such protein products include meat products, e.g. sausages, frankfurters, re-formed meats and meat balls which may be prepared from comminuted meat, known in the art as "meat paste" or "meat emulsion", and meat-like products based on non-animal protein, e.g. comminuted soya or wheat.

BACKGROUND OF THE INVENTION

In the preparation of such products, it is desirable to keep costs to a minimum. It is for this reason that skinless products such as sausages may be preferred to sausages with skins, since the cost of applying an edible skin to a sausage can amount to a substantial proportion of te total manufacturing costs. By "skinless" is meant a product free from an external supporting membrane of e.g. collagen or natural gut.

A conventional method of producing skinless products involves the use of a permeable cellulose casing which may be inedible, or at least unacceptable for consumption. This is filled with e.g. meat paste, formed into links, heat processed to form a heat coagulated protein skin and then cooled, after which the cellulose casing is removed. In United Kingdom Pat. No. 1,422,344 there is described a process in which the filled casing is treated with an edible acid which reacts with protein at the surface of the meat paste to form a skin, prior to removal of the casing. This may avoid the necessity for heat processing to provide a a coagulated skin, but the disposable casings are relatively expensive and their use is labor intensive.

It has been proposed to prepare a skinless product without the use of casings. One advantageous method of doing this is to treat the surface of e.g. a sausage, after it has been shaped, with a suitable fluid, for example an edible acid which reacts with protein and precipitates to form a cohesive surface for the sausage paste. In U.S. Pat. No. 3,503,756 there is disclosed a process in which a meat emulsion is extruded, and then treated in an acid bath, either before or after cutting into suitable lengths for frankfurters or the like. The treating of the extruded meat does however present handling difficulties.

In United Kingdom Pat. No. 1,441,494 there is disclosed a system in which an edible acid is introduced onto a meat emulsion before it is passed through an extrusion tube, so as to lubricate the emulsion as it passes through the tube, and also to form a cohesive skin for the product as it is extruded. The acid may be introduced through a sintered metal filter.

With this arrangement, as with many extrusion processes, there is the problem of controlling the weight of the product, which must be cut from the extruded length. Moreover, since extrusion and cutting take place after the acid has been introduced, the ends of a product will not be provided with a coagulated skin.

It has been proposed, e.g. in U.S. Pat. No. 2,897,745, to mold a sausage in a rigid re-usable mold. In this arrangement however, it is necessary to cook the product while in the mold, and this may take a considerable time—for example several minutes.

It is known, from for example U.S. Pat. No. 3,940,217, to insert certain treating liquids into a mold prior to injection of the product forming material—in that case a slurry. This does not however ensure an even distribution of the liquid over the product, due for example to gravity effects.

Summary of the Invention

Viewed from one aspect, the invention provides a method of producing a molded meat or meat-like product having a fluid treated surface, wherein molding is effected in a rigid mold cavity having a permeable wall through which is introduced the fluid for treating the surface of the product.

Viewed from another aspect the invention provides apparatus for producing a molded meat or meat-like product, comprising a rigid mold having a cavity, and means for introducing product-forming material into the cavity, wherein the cavity has a permeable wall, and means are provided for introducing through the cavity wall a fluid for treating the surface of a product.

Thus, in the preparation of a skinless sausage for example, an edible acid at ambient or elevated temperature may be introduced through the permeable wall of the cavity where it reacts with the protein of the meat to provide a cohesive surface. The introduction may be simultaneous with molding of the product.

The term "an edible acid" is intended to cover an acid which is permitted for use in connection with foodstuffs and which does not result in the production of inedible products. Such acids include organic acids, e.g. acetic acid, malic acid, ascorbic acid and citric acids, and inorganic acids, e.g. hydrochloric acid and phosphoric acid. The acid may generally be employed in the form of a simple aqueous solution with a pH of between 1.0 and 3.0, e.g. dependent on the availability of soluble protein content for precipitation; the higher the content, the higher the numerical value of the pH. The optimum pH can readily be determined by simple experimentation. In the case of British style sausages, a pH of about 1.5 may ordinarily be convenient, but for frankfurters a pH of about 2.5 may be adequate.

Other fluids may of course be employed, depending on the operation intended to be carried out. Thus, for example, a liquid solution containing coloring matter, flavoring, or smoke extracts to color or flavor the surface of a product, may be employed. Such fluids could be used with or without edible acids. Some smoke extracts for example may themselves serve to produce a coagulated skin. If required, hot water or steam could be used to heat the surface of the product and form a heat-coagulated cohesive surface, the permeability of the mold wall allowing contact of product material and heating medium, to give efficient heating.

The means for introducing product forming material into the mold cavity may comprise a nozzle movable into the cavity, if the material is to be injected under pressure into the cavity. This is especially suitable for sausages where the material is in the form of a paste. A plunger may be provided for compressing material within the mold cavity and for closing the end of the mold cavity.

The permeable wall of the cavity may be provided by constructing the mold of permeable material, for example sintered material such as stainless steel, or plastics material such as high density polyethylene. It is not of course essential that the entire mold be of permeable material not that all surfaces defining the cavity be permeable. It is only necessary for a sufficient area to be permeable to allow fluid to be applied to the required parts of a product. Generally, however, it will be desirable to treat the entire surface of a product. Preferably, therefore, means for closing the ends of e.g. a cylindrical mold cavity, are permeable.

The mold cavity could be in the form of a relatively thin-walled shell or tube, such as a cylinder and the means for introducing fluid through the cavity wall, i.e. the wall of the shell, could comprise a spray nozzle, arranged to spray in a circuit around the shell to ensure that all the required surface or a product in the cavity is coated with liquid. Alternatively an array of stationary nozzles could be disposed around the shell to ensure the required coverage.

The mold, whether in the form of a shell or for example a more substantial block of permeable material, could be disposed in a bath of the fluid to be applied to the surface of a product, so that the permeable wall is exposed to the fluid. In a particularly advantageous arrangement a permeable mold is disposed within a nonpermeable housing, e.g. of stainless steel or a suitable plastics material, and seated so that no substantial leakage can occur. The housing is filled to capacity with the required fluid, e.g. acid. The porosity of the permeable cavity wall is chosen such that no substantial amount of fluid can pass through it until external pressure is applied to the fluid within the housing/mold. Fluid is then injected into the housing by means of a suitable injection system. The excess pressure created causes fluid to pass through the permeable wall into the cavity. The quantity of fluid introduced through the permeable wall will depend on the quantity injected into the housing, and will generally correspond thereto.

The mold may comprise a body of permeable material having a cavity extending therethrough, open at both ends—e.g. a hollow sintered stainless steel cylinder. A movable plunger may be provided for closing one end of the cavity. This may also serve to compress the product forming material during molding and/or to eject a formed product. The other end may be closed by suitable means such as an end capping device, or a further plunger. Preferably, the faces of the plunger and end closing means are permeable to ensure that the ends of a product can be treated with fluid. Means may be provided to ensure that fluid reaches these permeable faces, for example an injector systems or a passageway interconnecting these faces and a reservoir surrounding the mould.

The plunger and the end closing means may be suitably shaped to give a required end configuration to the product, or they could have flat surfaces. The cavity could have any desired cross-section, for example square or triangular although it will frequently be circular.

Advantageously, apparatus in accordance with the invention is arranged for continuous operation. Preferably the mold is arranged for relative movement with respect to a plurality of stations where various operations are carried out, for example filling the cavity with material; compressing the material with the plunger; injecting fluid; ejecting a formed product; and returning the plunger to its initial position prior to re-filling of the cavity. In the case of a mold body open at both ends, such as a cylinder, it will be necessary to close the end opposite the plunger before compression and fluid injection. Thus an end cap could be urged into position by suitable means. Alternatively, the mold body could move continuously with respect to a solid base plate closing one end. Such a base plate could be suitably apertured to allow for e.g. filling the cavity and ejecting the product. The base plate could be provided with a groove of rounded cross-section, or another suitable cross-section, to shape the end of a product. This groove could be provided with permeable material, e.g. an insert of sintered metal.

It has been found that an end cap may be adequate for hard products such as British sausages, whereas a continuous base plate may be necessary for softer products such as frankfurters.

Preferably, the relative movement of the mold with respect to the various operating stations is rotational, it advantageously being the mold which moves. A number of molds may be moved synchronously, being at different stages of processing at any given time. A number of molds could be processed contemporaneously, moving in a group from station to station. It may be convenient to have four or eight molds processed together, this being the number of e.g. sausages usually packed together in the United Kingdom.

The apparatus may comprise a rotatable member on which are provided a plurality of housings, with their associated molds. For each housing there will be provided means for allowing the injection of fluid. Where two or more molds are to be processed together, they could be provided in a common housing, or in separate housings—fed from the same injection system or simultaneously from separate systems.

The housing may be fabricated from e.g. stainless steel, or e.g. comprise a block of plastics material. In this latter arrangement, the block—whether of one or more components—could have a cavity formed therein, defining a housing in which a permeable mold such as a sintered cylinder can be mounted, spaced from the walls of the cavity so as to provide a reservoir for fluid. One or more passages could extend through the block to allow for injection of fluid into the reservoir, from a suitable injection port, or a plurality of such ports.

In one preferred arrangement, the rotatable member itself comprises a block of plastics in which a plurality of cavities are provided to accommodate the required number of molds. The cavities may extend parallel to the axis of the member, being spaced around the member. A plurality of cavities could be grouped together, whether circumferentially or radially, depending on the number of molds to be treated together. In one preferred embodiment the member rotates about a horizontal axis.

A further rotatable member having a plurality of product receiving means, such as open-ended cavities extending therethrough, may be used for additional treating of the products formed in the molds. Thus, the futher member could pass through a bath. Products could be ejected from the molding apparatus, into a paraxial cavity in the futher rotatable member, passed through the bath, and then moved on for further processing. The bath could contain washing water, or for example further acid for treating a frankfurter and causing protein coagulation throughout the product.

Similar rotatable members, which could be in the form of a solid block, or a fabricated unit, could be used for drying—with air being passed over the products e.g. axially of the rotatable member; for cooking or smoking—with hot air, steam or smoke being passed over the products; or for freezing—with e.g. nitrogen being blown over the products. When used for freezing, cooking, drying or the like, the rotatable member should preferably be disposed in a sealed compartment through which the relevant medium such as air or nitrogen can be passed. The member may be arranged so that as it rotates, portions pass out of the compartment—through suitable seals—and then back into it, once again through suitable seals. This allows access to the receiving means, to enable receiving and subsequent ejection of products.

Since the members preferably rotate about a horizontal axis, the products will tend to move relative to their receiving means, i.e. cavities, during rotation so as to ensure even treatment. Thus for example even cooking and a constant surface coloration may be obtained.

Products may be passed from the rotatable members in direct series, being ejected from one cavity for example, into another on the following drum, wheel or other rotatable member. Finally processed products could be passed from a rotatable member directly onto a conveyor for further operations such as packing.

Rotary apparatus of the type described above, for use in washing, drying, cooking or freezing food products, is of itself advantageous, and could be used in applications other than in association with the molding apparatus in accordance with the present invention.

Where a number of products are formed at the same time, they may be e.g. washed, dried, frozen, etc. contemporaneously, and then finally ejected onto a conveyor or the like as a unit, ready for packing with the minimum of further collating, handling etc.

Weight control of the products may be provided by metering the quantity of e.g. meat paste injected into the molds by means of a suitable portioning device e.g. a rotary valve. Since it is common to sell sausages in packets of a given weight, rather than individually, a single metering device may provide the meat paste to be supplied via e.g. a multiple tube injector to a number of molds to be processed together, corresponding to the number of sausages—or other products—to be packaged together. In this manner there will be the correct weight in the package, even if the sausages differ marginally in weight from one another.

It has been found that, particularly in the case of sintered metal molds which become saturated with acid, after the product has been ejected, residual acid may remain on the inner walls of the cavity. When e.g. meat paste is injected for a subsequent product, a skin may form without further acid injection. To avoid forming a double skin or compressing the product after a skin has formed, it may be necessary to have the acid injection, and paste compression stages very close to the meat paste injection stage, for example, almost simultaneous therewith.

It might be desirable to take advantage of this effect and to have a fluid injection stage before the product forming material is inserted into the mold cavity. The permeable nature of the cavity wall will hold the fluid in position, so that even coverage of the eventual product will be obtained; compression should take place without delay. A subsequent injection of fluid, e.g. acid, may still be desirable, for example to provide further protein coagulation; an excess of acid, i.e. acid still remaining on the cavity walls, will assist in motility during product ejection. Indeed, the presence of such excess acid, whether or not merely as a residual amount from skin formation, is an advantage as far as lubrication is concerned. On the other hand, should the presence of excess fluid be a disadvantage in certain applications, means could be provided for washing or wiping excess acid from the surface of the cavity walls. It might be possible to assist ejection of a product, not by means of a lubricating liquid, but by air or another gaseous medium. This could provide an e.g. air cushion to reduce friction. The air could be introduced through the permeable cavity walls, as with the other fluids discussed herein.

Although the invention is particularly advantageous in the production of skinless products, it is also applicable to the production of e.g. sausages with skins, i.e. with a supporting membrane which is not merely a coagulation of protein on the surface of the product. Thus, at the same time as e.g. meat paste is introduced into the mold cavity—or possibly even before—a skin forming substance could also be introduced so that it will lie between the meat paste and the cavity walls. The fluid introduced through the cavity walls will be such as to react with the skin-forming substance so as to produce the required skin.

Thus a viscous collagen mass could be extruded into the cavity, and treated with alkaline ammonia, saline solution or another appropriate food grade reagent. Co-extrusion apparatus could be employed so that the collagen mass is extruded as a thin tube or membrane around the meat paste as this is being extruded into the cavity. It might be advantageous to push the collagen mass through a fan-tail type of tube which will create a degree of fibre orientation. The extrusion tube for the collagen mass—i.e. the outer tube in co-extrusion apparatus—could rotate, so that there will be a biaxial orientation of the fibre/fibril collagen mass whilst it is passing down the length of the tube. The collagen mass, as it is extruded, will be forced tightly against the cavity wall by the bulk of material injected into the cavity, i.e. the meat paste, and subsequently by compression when a plunger is activated to shape and compress the product.

After forming, and ejection from the molding apparatus, the product may be dried to reduce the moisture content of the collagen casing to a level of, say, less than 20%. The time duration is dependent on the solids content of the collagen mass and the type of dryer, air temperature and velocities which are used. Rotary apparatus of the type described earlier, may be employed in the drying stage.

BRIEF DESCRIPTION OF DRAWINGS

Some embodiments of the invention will now be described by way of example and with reference to the accompanying drawings, in which.

DETAILED DESCRIPTION

Figure 1:
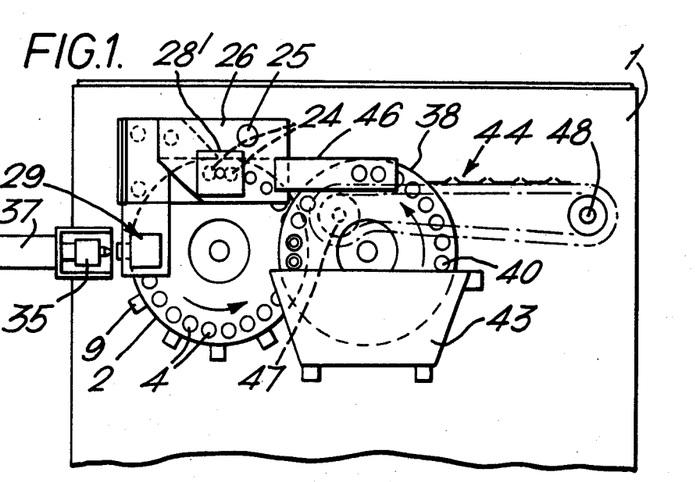
FIG. 1 is a front elevation of a first embodiment of apparatus in accordance with the invention.
Figure 2:
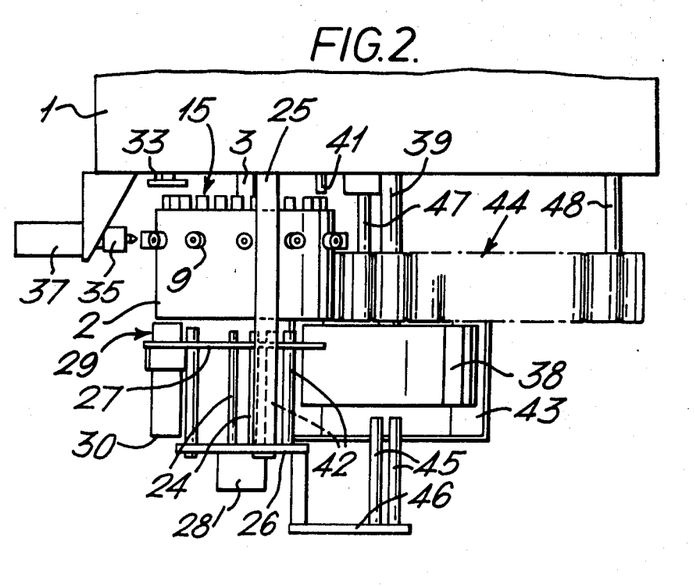
FIG. 2 is a plan view of the apparatus.
Figure 3:
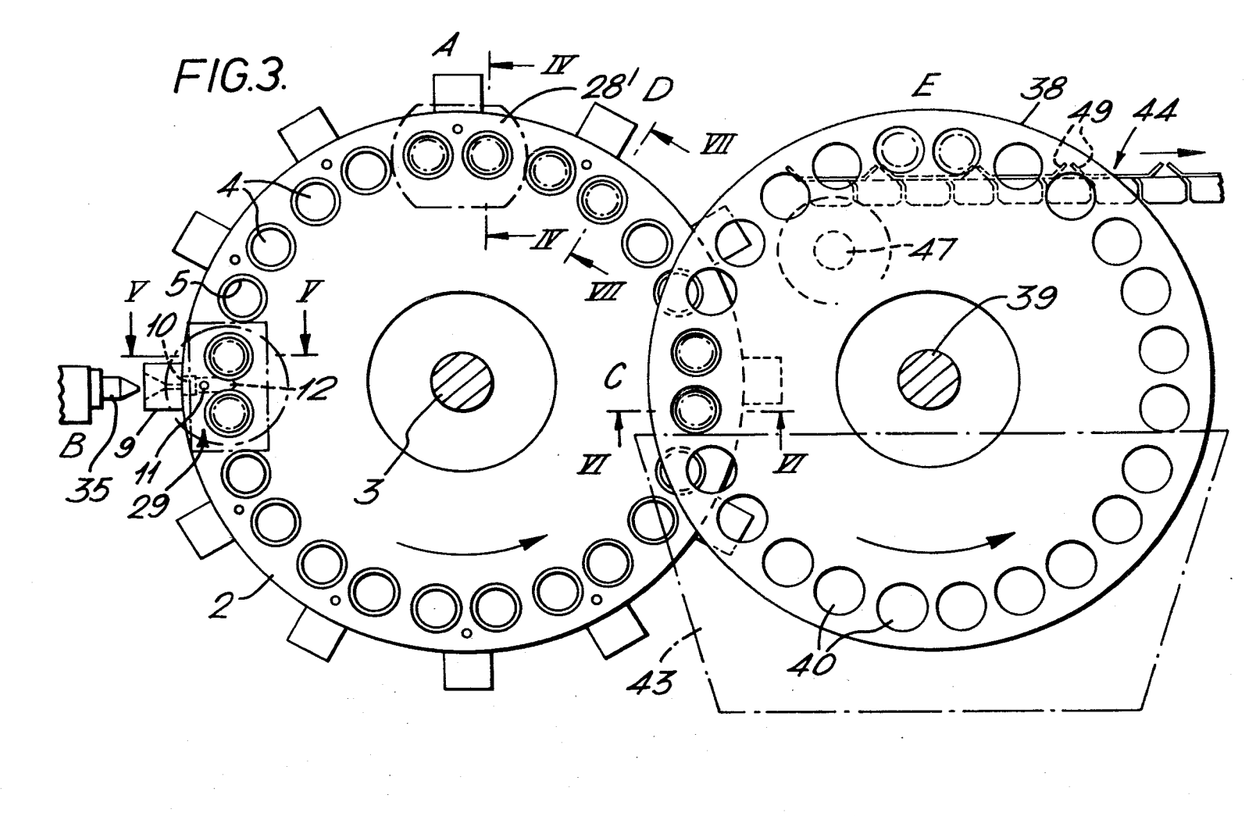
FIG. 3 is an enlarged view of part of the apparatus shown in FIG. 1.

Referring now to FIGS. 1 to 7, the apparatus includes a frame 1 on which is mounted a rotatble cylindrical drum 2, on an axle 3 for driven rotation in a counter-clockwise direction about a horizontal axis as shown by the arrow on FIGS. 1 and 3. The drum 2 is in the form of a block of high density polyethylene, although it could be of nylon or any other suitable material. The drum material is impervious.

Figure 4:
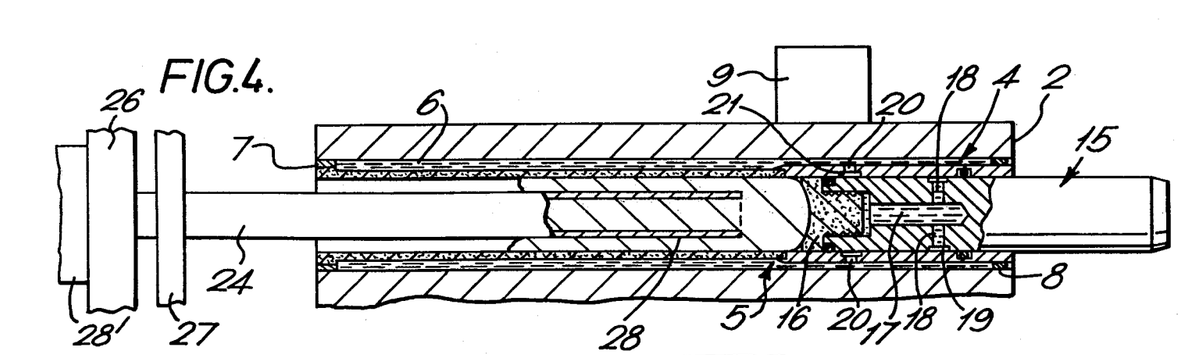
FIG. 4 is a partial section on the line IV—IV of FIG. 3.

Around the perimeter of the drum 2 are provided twenty four cylindrical, open ended cavities 4 of circular cross-section, extending parallel to the axis of rotation. As shown in FIG. 4 for example, in each of these is mounted a cylindrical mold body 5 in the form of an open ended tube of circular cross-section. The external diameter of the mold body 5 is less than the diameter of the cavity 4, for example by a few millimeters, so as to provide a reservoir 6 defined by the annular space between the two. The ends of the reservoir are sealed by a packing piece 7 and an O-ring 8 respectively.

The cavities 4 are grouped together in pairs, and with each pair is associated an acid injector port 9, provided with a ball-valve sealing system (not shown). The injector port communicates with its two associated reservoirs 6 by means of a passage 10 (FIG. 5), communicating with an axially extending passage 11 (FIG. 3), and thence via cross-bores 12, suitably position along cavity 4, with the reservoirs 6.

Each mold body 5 is of stainless steel, having a permeable, sintered portion 13, and a solid portion 14. Within the mold body is sealably and slidably positioned a plunger generally indicated at 15, which may be of stainless steel. The end face of plunger 15 is formed by a sintered stainless steel insert 16 threaded into a cavity 17 in the plunger 15. The insert has a concave domed face, to shape the end of a product. The cavity 17 communicates by means of crossbores 18 with a circumferential groove 19 in the outer surface of the plunger 15. Bores 20 extend through solid portion 14 of the mold body 5, and communicate with a circumferential groove 21 therein, arranged to co-operate with the groove 19 in the plunger 15. There is thus fluid communication between reservoir 6 and the cavity 17 in plunger 15. O-ring seals 22 and 23 in the plunger and mold body respectively, prevent leakage during fluid injection.

In operation, the drum 2 is rotated stepwise to selectively bring the pairs of associated mold bodies 5 with their associated plungers 15, to a number of operating stations. These are marked A, B, C, and D on FIG. 3.

At station A, the plunger 15 is in the position shown in FIG. 4. A pair of injector tubes 24 are inserted into the mold bodies 5, one for each of an associated pair, by means of suitable apparatus driving an arm 25 carrying a frame 26 on which the tubes are mounted. The tubes are guided through apertures in a stationary mounting plate 27.

Figure 5:
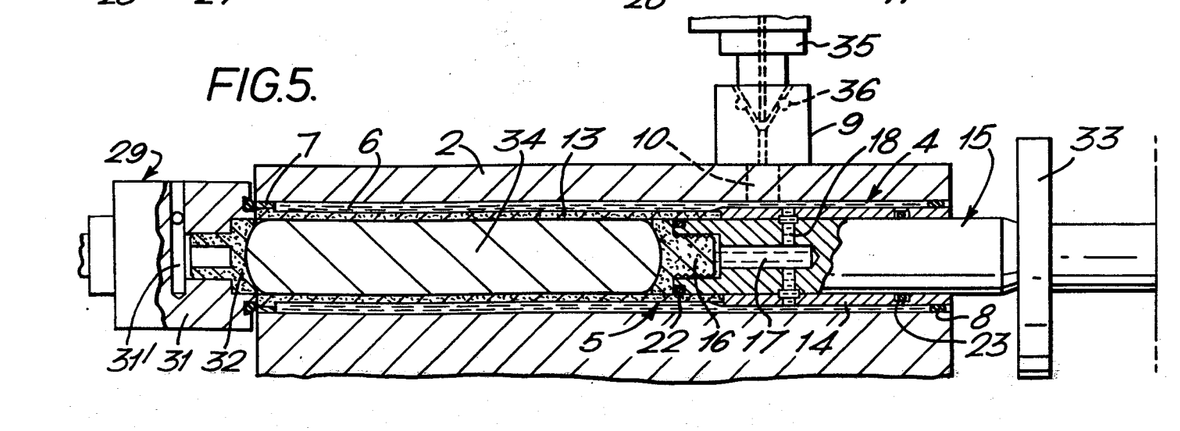
FIG. 5 is a partial section on the line V—V of FIG. 3.

An emulsion 28 containing sausage meat of a plastic consistency is injected through the tubes by means of a suitable metering valve 28', feeding the two tubes 24 simultaneously. The tubes 24 retract as injection takes place, frame 26 moving away from the drum 2. The injection of the emulsion, in which salt and water soluble portein of the meat have been extracted during a blending or chopping up operation, produces a protein smear deposited on the inner surface of the mold bodies. When the cavities in the mold bodies 5 have been filled with emulsion, the tubes 24 are fully retracted, and the drum indexed round to bring the pair of mold bodies to station B. Here the position is as shown in FIG. 5.

An end capping device 29 supported on plate 27 is moved into position against both mold bodies by suitable means such as a penumatic unit 30. This device includes a block 31 provided with a pair of sintered stainless steel inserts 32 mounted therein. The inserts have concave domed faces to shape the end of the products. The inserts communicate with a passageway 31' so that fluid can be passed through them.

At the same time as the end capping device 29 is moved into position, a tamping plate 33 is moved forward by suitable means to contact the pair of associated plungers 15 and urge them down their mold bodies to compress and compact the emulsion, to form the products, i.e. sausages 34.

The reservoirs 6, and cavities in the plungers 15 and end capping device are already filled to capacity with a suitable edible acid for example of pH 1.5, and the sintered parts are saturated. As the products are formed, an acid injector nozzle 35, which has been moved into sealing engagement with the injector port 9—provided with a sealing ring 36—by suitable means such as a pneumatic device 37 mounted to frame 1, is used to inject additional acid into the reservoirs 6 and plunger cavities 17. The acid injection system communicates with passages 31' in end capping device 31 via an external line (not shown), and additional acid is therefore also passed into there. Thus acid passes through the permeable, sintered parts 13, 16 and 32 defining the mold cavities, and onto the surfaces of the products 34 to react with the protein and form a cohesive surface. As is evident in the drawings and as described herein, at least a major portion of the surface area of the cavity walls formed by parts 13, 16 and 32 is porous or fluid permeable. Thus, fluid introduced therethrough is effective to treat at least a major portion of the surface of the proteinaceous product shaped therein.

The injector nozzle 35, end capping device 31, and tamping plate 33 are then withdrawn, and the drum 2 indexed round until the pair of mold bodies, with products 24 therein, reach station C. During this period—which may be for example 6 or 7 seconds—the acid penetrates the required depth into the product surfaces to form an acceptable cohesive surface.

Adjacent the station C is a second cylindrical drum 38 of high density polyethylene, mounted on an axle 39 for rotation in a clockwise direction as shown by the arrows on FIGS. 1 and 3, about an axis parallel to that of drum 2. This second drum 38 includes twenty four, axis-parallel, open ended cavities 40 of circular cross-section, corresponding to cavities 4 in drum 2. The radial positions of the axes of cavities 40, and their circumferential spacing, is identical to cavities 4 in drum 2. The cavities 40 have smooth interior surfaces, and their diameter is a few millimeters greater than that of the products 34, i.e. than the internal diameter of mold bodies 5.

Figure 6:
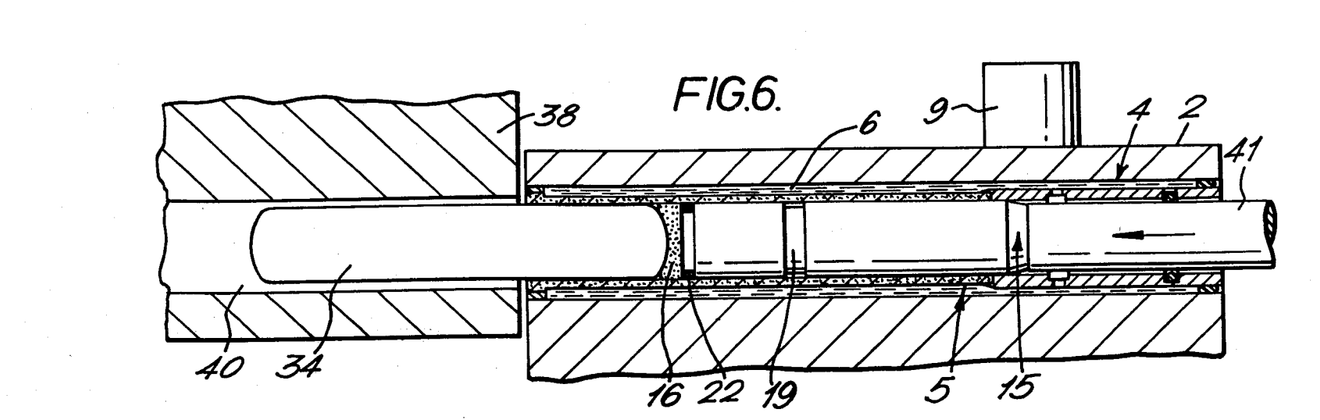
FIG. 6 is a partial section on the line VI—VI of FIG. 3.

The drums 2 and 38 are indexed synchronously, so that when a pair of cavities 4 with molded products 34 arrive at station C, they are aligned with a pair of empty cavities 40, as shown clearly in FIG. 6. At this stage, push rods 41 are urged forwards by suitable means, to push plungers 15 along the mold bodies 5, to eject the formed sausages into cavities 40. An intermediate position is shown in FIG. 6, with the sausage 34 in the process of being ejected.

Figure 7:
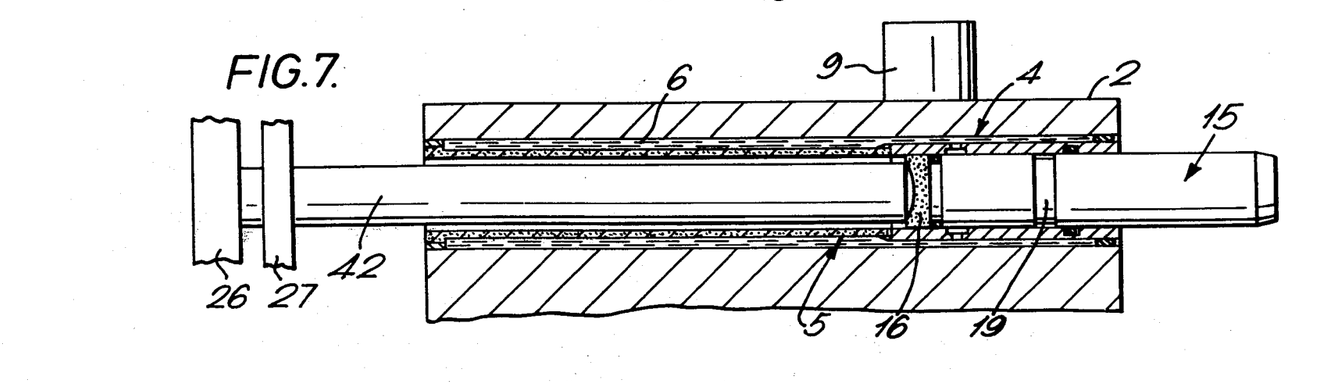
FIG. 7 is a partial section on the line VII—VII of FIG. 3.

Following this, push rods 41 are retracted out of the cavities and drum 2 is indexed round to bring the pair of mold bodies 5 to station D. At this station, as shown in FIG. 7, a pair of return rods 42, carried by frame 26 and guided though apertures in plate 27, are inserted into the mold bodies, urging the plungers 15 back to their original position as shown in FIG. 4. The return rods are then retracted and the drum indexed round to bring the pair of mold bodies to station A, so that the complete process can be repeated.

At the same time as the pair of mold bodies 5 moves away from station C to station D after product ejection, the drum 38 is indexed round to bring a fresh pair of cavities into registry with the next pair of mold bodies being indexed into station C on drum 2. The cavities on drum 38, when they have received products 34, thus continue rotary movement.

The bottom portion of the drum 38 passes through a bath 43 containing a washing fluid such as water. Thus, as the drum 38 is indexed round, the products 34 lying loosely in cavities 40 are therefore washed. After passing out of the bath 43, as the drum continues to be indexed, the washed products 34 are moved round to station E. During this period, any excess washing fluid will drain back into bath 43. Means may be provided to retain products in cavities 40 during treatment.

At station E, the pair of products, which have been processed and washed together, are ejected onto a conveyor belt 44 by means of ejector rods 45 carried by an extension 46 of frame 26. The rods 45 are then withdrawn and a fresh pair of washed products indexed into position for ejection.

The conveyor belt 44 which is driven around shafts 47 and 48, comprises a number of individual trays 49, each designed to receive the two products which are ejected simultaneously at station E. These products are then carried by the conveyor for further processing—i.e. packaging.

The above apparatus is particularly suitable for British sausages, and other products where the emulsion or paste is of a fairly thick consistency. In the case of products where the emulsion consistency is lower—for example in the manufacture of frankfurters—it may be necessary to close the end of the mold bodies 5, at positions other than merely at station B where compression takes place. It may be particularly desirable to keep the emulsion under compression during movement of the product from station B to station C, i.e. while the acid treated emulsion sets.

Figure 8:
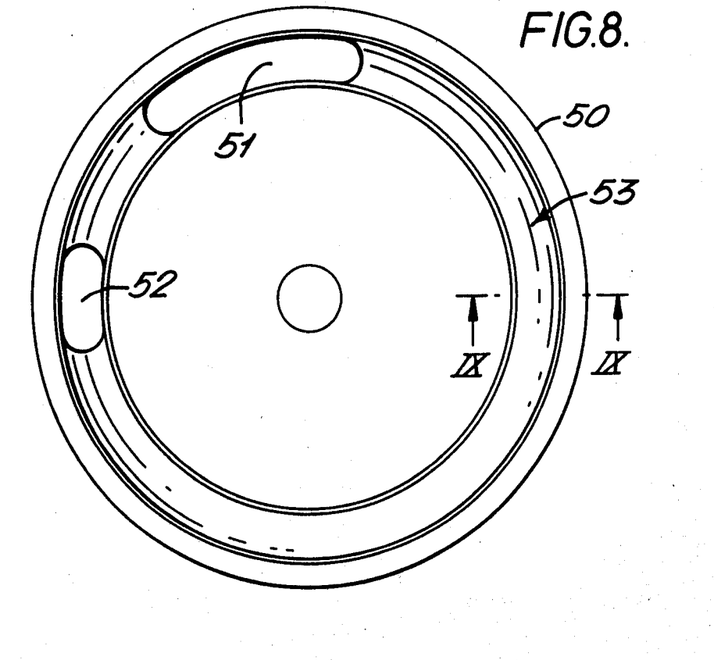
FIG. 8 is a rear elevation of a base plate for use in a modified form of the apparatus of FIGS. 1 to 7.

Thus, in a modification of the above described embodiment, the end capping device 29 is omitted and instead a circular base plate 50, as shown in FIG. 8, is employed. The drum 2 slides round over this base plate, and the mold bodies 5 are thus closed, apart from in certain positions. Thus, arcuate apertures 51 and 52 are provided to allow for operation of the return and filling apparatus at stations D and A, and the ejection apparatus at station C, respectively. The plate 50 will be positioned between drums 2 and 38 at station C.

Figure 9:
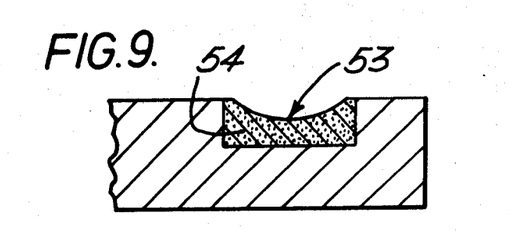
FIG. 9 is a partial section on the line IX—IX of FIG. 8.

To provide a rounded end shape for the product, the plate 50 includes an annular groove of curved cross-section as shown in FIG. 9. This groove 53 is defined by a sintered stainless steel insert 54, at least in the region of station B where acid injection takes place. The groove might be omitted between stations C and B, if desired. Acid may be positively injected through the insert 54, as for the end capping device 29, or reliance may be made on a general flow of acid through sintered portion 13 of mold body 5, to bring acid into the insert 54.

In the production of a frankfurter the acid could have a pH of 1.5 when injected at station B to provide a skin. The bath 43 could then be filled with acid of pH 2.5, to provide coagulation throughout the product. Alternatively, an acid of pH 2.5 could be used initially, a longer dwell time then being required. The speed of drum rotation, or the distance between acid injection and product ejection stations, can be chosen appropriately.

The drums 2 and 38 are rotated synchronously by suitable means in the above described embodiments, and operations at the various stages are synchronized, so that continuous operation is possible, and sausages or frankfurters will be produced and fed onto conveyor 44 in pairs, at time intervals corresponding to the time for one indexing of the drums. Although in the above described embodiments, two products are processed together, any such number could be processed, for example 4, 5, 8 or 10, depending on the required number of products to be packaged together.

Figure 10:
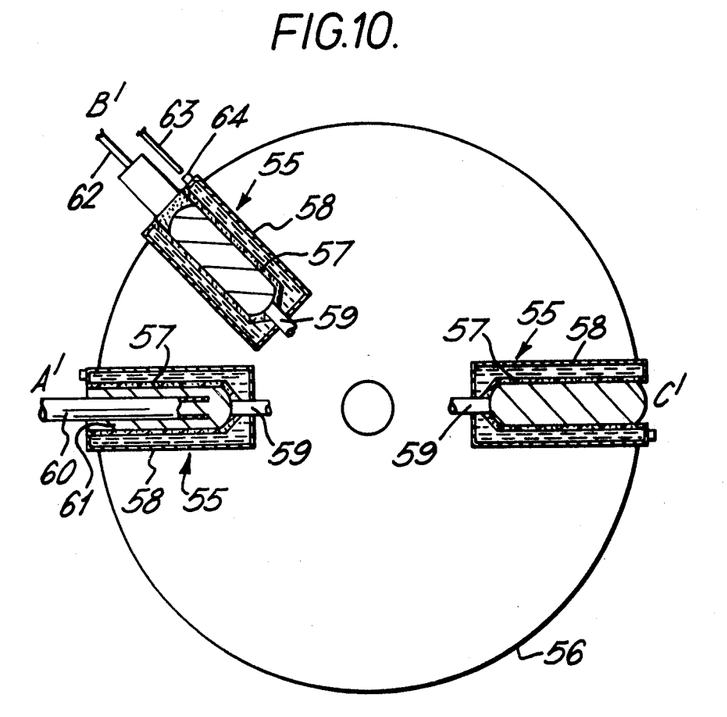
FIG. 10 is a schematic view of an alternative embodiment of apparatus in accordance with the invention.

In the alternative embodiment illustrated in FIG. 10, a plurality of mold units 55 are disposed on a rotary wheel 56. Each unit comprises sintered metal mold 57 in a sealed housing 58 for fluid. The bases of the cavities in the molds 57 communicate with pneumatic tubes 59 connected to a source of air.

At station A', a nozzle 60 injects material 61 such as meat emulsion into the cavity of the mold 57. At station B' an end former 62 is used to compress the material, and at the same time an injector nozzle 63 is used to inject e.g. acid into the housing 58 through inlet 64 so that fluid permeates through the mold 57 to the surface of the molded product.

At station C' air is supplied through tube 59, so as to eject the molded product from the mold cavity under air pressure.

The sintered stainless steel components could be of any desired permeability, depending for example on the viscosity of the fluid to pass through them. A typical permeability would be $1.0 \times 10^{-8}$ cm$^2$, which might result in a pressure of 1 psi to drive the acid through the cylinder. Different permeabilities might be required for the plunger and end closing means and possibly higher pressures—say up to 9 psi. At least the surfaces of the sintered—or other permeable—components which contact the products, should be smooth.

Higher permeabilities—say up to $70 \times 10^{-8}$ cm$^2$—might mean that the acid or other fluid would not need positive injection and would simply soak through. Thus, a sintered mold could merely be passed through a bath of e.g. acid.

It might also be desirable to inject acid directly into a sintered metal unit, without there being a surrounding reservoir. Thus, the mold units 5 could completely fill their cavities 4.

The quantity of acid injected depends on many factors, but it has been found that a quantity of say ½ to 1 cm$^3$ may be sufficient to give 0.3 mm coagulated surface for a standard sausage. The injection system ensures that only a predetermined quantity of acid is used; the meat injector system allows for constant weight products.

Although rotary apparatus in particular has been described, linear apparatus could be employed.

The invention extends also the products made by a method or apparatus in accordance with the invention. It will be appreciated that as described above in relation to frankfurters, the invention is applicable to products which are treated throughout, rather than merely in a surface layer.

I claim:

1. A method of producing a skinless molded meat or meat-like product of predetermined shape having a fluid treated surface, said method comprising:
    (a) providing a rigid mold cavity having side walls and oppositely disposed end walls defining a predetermined shape and having said side walls permeable over a major portion thereof,
    (b) introducing a product into the mold cavity, which product conforms to the predetermined shape of the mold cavity, and
    (c) introducing a fluid through said permeable side walls for treating at least a major portion of the surface of the product to form a coagulated surface layer on said product at least while in said predetermined shape.

2. A method as defined in claim 1 wherein
    the permeable side walls are exposed to a reservoir of the fluid, and
    the fluid is caused to flow through the permeable walls into the cavity when an excess pressure is applied to the fluid in the reservoir.

3. A method as defined in either claim 1 or 2 wherein introduction of the fluid is effected simultaneously with molding of the product.

4. A method as defined in either claim 1 or 2 wherein the fluid reacts with the surface of the product to form a cohesive surface.

5. A method as defined in claim 4 wherein the fluid is an edible acid.

6. A method of producing a skinless proteinaceous product having a fluid treated surface, said method comprising the steps of:
    (a) providing a rigid mold cavity having a wall at least a major part of which is permeable and oppositely disposed end walls to define a predetermined shape,
    (b) injecting proteinaceous paste material into said rigid mold cavity to form a proteinaceous product with said shape, and
    (c) introducing the fluid through said rigid permeable wall for forming a coagulated surface layer over at least a major part of the surface of the product while in said predetermined shape.

7. A method as claimed in claim 6 wherein
    the fluid introducing step includes exposing the preamble wall to a reservoir of the fluid, and the fluid is caused to flow through the permeable wall into the cavity when an excess pressure is applied to the fluid in the reservoir.

8. A method as claimed in claim 7 wherein
    the fluid introducing step is effected simultaneously with the proteinaceous material injecting step.

9. A method as claimed in claim 6 wherein
    the fluid reacts with the surface of the product to form a cohesive surface.

10. A method as claimed in claim 9 wherein
    the fluid is an edible acid.

11. A method for producing a skinless molded proteinacenous product of predetermined shape, said method comprising:
    (a) providing a rigid mold having said walls and oppositely disposed end walls which are movable with respect to each other and define a mold cavity;
    (b) injecting a predetermined quantity of product-forming material into said cavity;
    (c) effecting relative movement of said end walls toward each other to shape the ends of the material,
    (d) at least a major portion of the surface area of the cavity walls in contact with the product-forming material in said predetermined shape being porous, and
    (e) supplying a metered quantity of fluid through said major porous wall portion to treat the compacted shape material in contact therewith to form a coagulated surface layer on the shaped product.

12. A method as claimed in claim 11 wherein
    said mold is disposed in a non-permeable housing adapted to contain fluid, and
    said injecting step includes introducing a metered quantity of fluid into the housing to create an excess pressure therein thereby urging fluid through said porous wall portion.

13. A method for producing a skinless molded proteinaceous product, said method comprising:
    (a) providing a rigid, hollow cylindrical member composed of porous material throughout a major portion of the length of said cylindrical member and having oppositely disposed ends, an impermeable housing surrounding said cylindrical member and extending the length thereof, said housing being spaced outwardly from said cylindrical member, sealing means extending between said housing and said cylindrical member adjacent both ends thereof and defining an annular chamber extending along said cylindrical member, and a source of fluid in communication with said chamber,
    (b) injecting product forming material into said cylindrical member,
    (c) closing both ends of said cylindrical member,
    (d) acting on the ends of said material in said cylindrical member to shape the ends of the product,
    (e) supplying a predetermined quantity of fluid from said source to said chamber to urge fluid through the porous cylindrical member to form a coagulated surface layer on the product,
    (f) opening at least one end of said cylindrical member and
    (g) ejecting the treated product from said cylindrical member.

* * * * *